INVENTOR.
ARMANDO PODESTA
CARLO VIGNATI
ANDRE BEREZIAT

United States Patent Office 3,434,325
Patented Mar. 25, 1969

3,434,325
APPARATUS FOR THE MANUFACTURE OF CAPS FROM SHEET MATERIAL
Armando Podesta and Carlo Vignati, Milan, Italy, and Andre Bereziat, Lyon, France, assignors to L'Aluminium Francais, Paris, France
Filed Nov. 23, 1965, Ser. No. 509,296
Claims priority, application France, Nov. 27, 1964, 996,615
Int. Cl. B21d 22/06, 51/16
U.S. Cl. 72—354     11 Claims

ABSTRACT OF THE DISCLOSURE

Apparatus for forming caps having a pre-rolled edge from sheet metal into a blank having an outer cylindrical section open at one end and closed at the other end by a relatively flat panel portion. The apparatus is formed of a first pusher member having an end portion on which the cap blank is adapted to be received, a second pusher member in endwise alignment with the first pusher member with means for endwise displacement of one or both of the pusher members in a direction towards and away from the other to engage the central planal portion of the cap blank therebetween, a guide member concentric with the first pusher member having a cylindrical section spaced outwardly from the first pusher member and a base portion of curvilinear shape, and an annular punch concentric with the second pusher member having an end portion dimensioned to be received within the annular space between the first pusher member and the cylindrical section of the guide member for engagement with the portion of the cap blank extending outwardly beyond the pusher members for displacement of the engaged edge portions with the curvilinear base of the guide member to roll the edge portion of the blank inwardly during formation of the cap while continued displacement of the punch operates to form the portions of the cap between the rolled edge and the planal section. The guide member may be formed of separate elements to facilitate the manufacture thereof and provide resiliency in the formation of the cap.

---

This invention relates to a closure in the form of a cap to be mounted in sealing relationship about the ringed or beaded mouth of a container and to an apparatus for the manufacture of same and it relates more particularly to a bottle cap and to means for the manufacture thereof.

In accordance with the practice of this invention, a cap is produced having an inwardly rolled rim about its rolled edge by which the cap is locked in sealing relationship onto the ring or bead formed about the neck of a hollow body or container.

Caps of the type described are characterized by providing a fluid-tight, durable closure even when the fluid contained in the hollow body or container is under high pressure and even when the cap is manufactured of thin sheet stock, such as of metal, metal alloy, plastic material or metal-plastic combinations.

Development of the described characteristics depends upon the fabrication of a cap with the bead on the lower edge pre-rolled through an angle of at least 400°. To the present, a simple and efficient device has not been available for effecting the described rolling operation for production of caps of the type described and wherein such rolling operation can be carried out in a simple and efficient manner. In order to make caps available for operation under high pressure, even when manufactured of thin gauge sheet metal, it is desirable to effect the forming operation without reduction or variation in thickness of the sheet metal throughout the area of the cap.

It is an object of this invention to produce a closure cap of the type described formed of sheet material in which the cap is uniform in cross-section throughout the cap and in which the lower edge of the cap is pre-rolled in the inward direction to provide a rounded bead about the lower edge of the cap and it is an object of this invention to provide a means and apparatus for the manufacture of caps of the type described.

It is a related object to provide an apparatus for the manufacture of a cap of the type described from a blank of sheet material having an outer, substantially cylindrical section and a planal portion closing one of the bases of said cylindrical section.

These and other objects and advantages of this invention will hereinafter appear and for purposes of illustration, but not of limitation, embodiments of the invention are shown in the accompanying drawings, in which—

Figure 1:
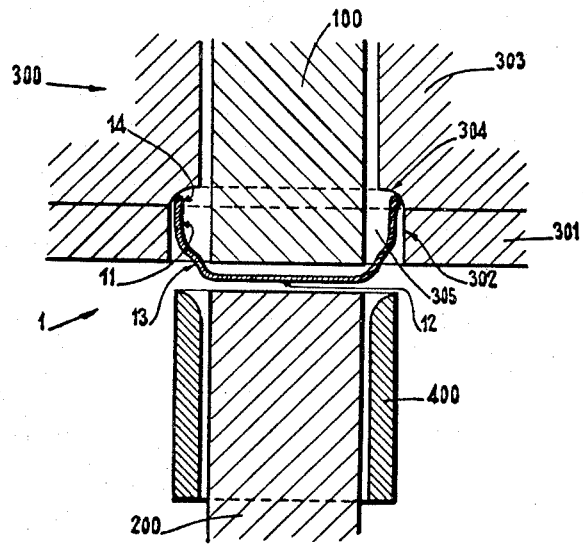
FIG. 1 is a schematic sectional elevational view showing the arrangement of elements of the machine at the start of the cap forming operation.

Briefly described, the apparatus of this invention comprises the combination of a first pusher member, a second pusher member, a guide and an annular punch, in which the first pusher member is capped by the blank; in which the second pusher member is positioned endwise opposite the first pusher member for cooperation therewith to engage the planal portion of the blank therebetween; in which the guide engages the lateral portions of the blank about the first pusher member and is formed with a cylindrical portion and a portion having substantially the shape of a quarter torus on its inner surface; and in which the annular punch surrounds the second pusher member and is adapted to project into the space between the cylindrical portion of the guide member and the first pusher member to lock the upper zone of the lateral portion of the blank against the lateral surface of the first pusher member and to effect forward displacement of the lateral portions of the blank extending into the space between the guide and the first pusher member for rolling the edge portions on the toroidal surface of the guide member responsive to translatory movement of the pusher members.

In the preferred practice of the invention, the annular punch has incisions at its lower end which are adapted to form serrations on the outer surface of the pre-rolled bead of the cap to facilitate removal of the cap from the hollow body, hereinafter referred to as a container or bottle, without interfering with the solidity of the cap or its mounted relationship on the container.

Referring now to the drawings for a more detailed description, the cap is formed by the apparatus from a blank 1 of thin sheet material stamped to provide an outer cylindrical portion 11 open at one end and closed at the other by a crosswise extending planal portion 12.

Figure 2:
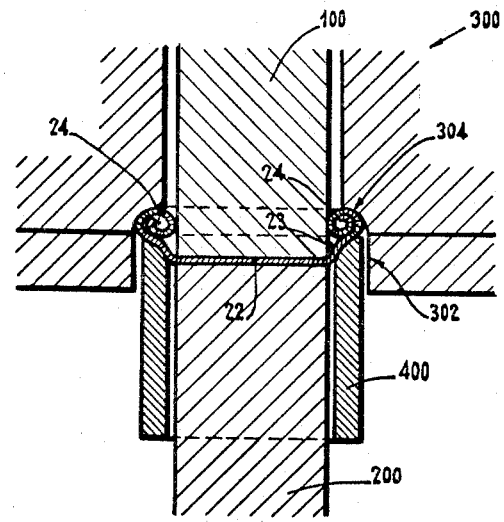
FIG. 2 is a schematic sectional elevational view similar to that of FIG. 1 showing the arrangement of elements of the machine at the end of the cap forming operation.

The apparatus comprises a first pusher member 100 which receives the blank 1 on the end thereof and a second pusher member 200 in endwise alignment with the first pusher member and in which one or both of the pusher members are mounted for lengthwise movement in the direction towards and away from each other to grip the blank across its planal portion 12 therebetween, as shown in FIG. 2.

The first pusher member is concentrically enclosed between a guide member 300 having a central bore dimensioned slidably to receive the rod-like first pusher member therein for relative reciprocal movement. The guide member is formed at its outer end with a contiguous cylindrical portion 302 of larger dimension with a toroidal portion 304 at the base forming the shoulder between the bore of smaller dimension and the bore of larger dimension of the cylindrical section 302 and in which the toroidal or curvilinear portion is contoured to correspond substantially to the shape of a quarter torus.

The second pusher member 200 is enclosed within an annular punch 400 in the form of an annular sleeve section having an inner wall to wall dimension which is slightly greater than the diameter of the first pusher member and an outer wall to wall dimension which is less than the diameter of the cylindrical section 302 of the guide member 300 so that the end portion of the annular sleeve can be displaced into the space 305 between the first pusher member and the surrounding cylindrical section 304 of the guide member 300 to engage the portion of the blank 1 which extends outwardly of the planal section 12 and is located within the space 305, to effect displacement thereof in a manner to bring the outer edges into sliding engagement with the toroidal portion of the guide member which operates to turn the engaged portions of the blank inwardly to form the rolled edge 23, as the punch is displaced endwise into the opening 305, to form the cap.

Figure 3:
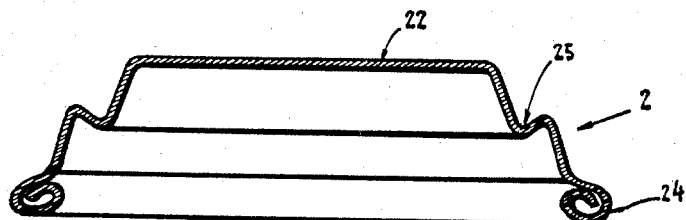
FIG. 3 is an enlarged sectional elevational view through a cross-section of the cap manufactured in accordance with the practice of this invention.
Figure 4:
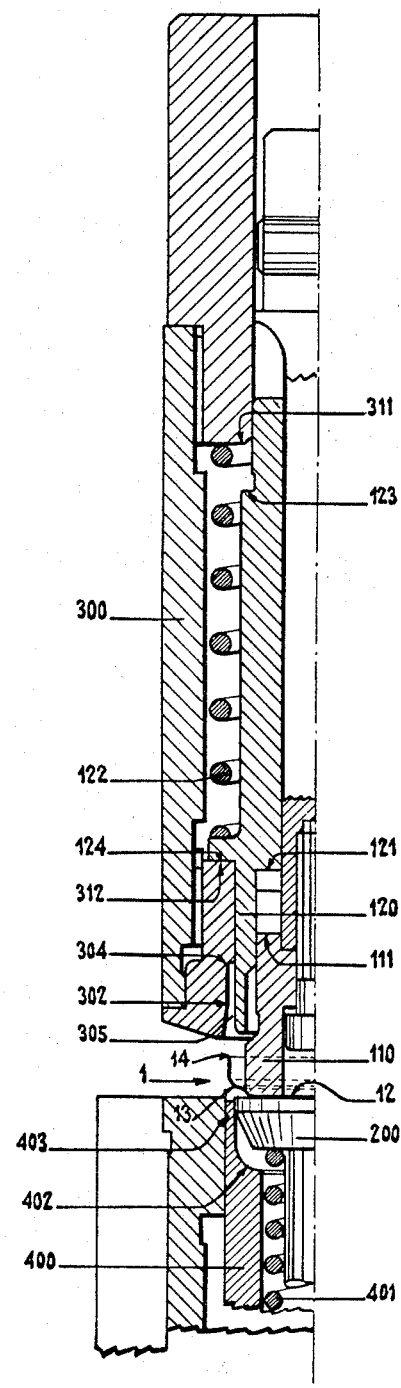
FIG. 4 is an elevational view of a half section of a device for use in the practice of this invention showing the arrangement of elements during an initial stage of the cap forming operation.
Figure 5:
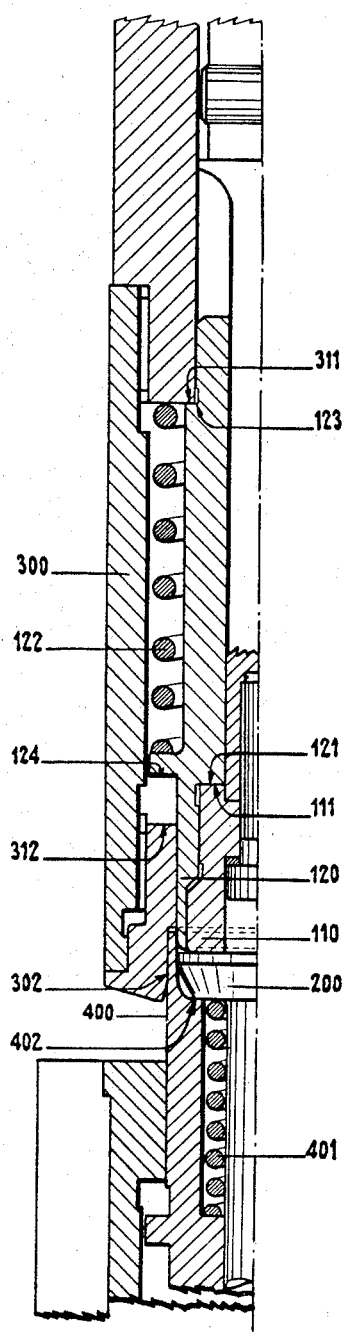
FIG. 5 is a sectional elevational view similar to that of FIG. 4 showing the arrangement of elements during the final stages of the cap forming operation.

FIGS. 1 and 2 show the pusher members provided with plain, flat gripping faces, but these faces may have other shapes, depending on the profile which it is desired to impart to the central body portion of the cap. For example, they may be formed in their outer edges with recesses whereby the formed cap can be provided with a resilient S shaped section 25, as shown in FIG. 3, which facilitates the mounting of the cap in sealing relation on the container. In the alternative, the faces may be formed with recesses permitting the formation of folds of any desired nature, or they may be embossed to impart advertising text, and the like.

The guide member 300 may be in the form of a unitary member formed of a single piece of metal. In order to avoid the action of waste material which might fall to the bottom of the empty space 305, it is preferred to form the guide member of two parts 301 and 303. Under such circumstances, the part 301 can be formed separate and apart from the part 303 and the latter may be formed integral with the annular punch 400.

The mode of operation of the apparatus is as follows: With the pusher members 100 and 200 separated one from the other, the blank 1 is inserted in such a manner that it caps the pusher member 100 with the cylindrical portion 11 extending outwardly beyond the base of the first pusher member into the space 305 between the first pusher member and the cylindrical section 302. The pushers are then displaced in the direction towards each other firmly to grip the planal portion 12 of the blank and, to mold the shape corresponding to any recesses with which the pusher members might be formed, such as indicated by the numeral 25 in FIG. 10. Then the annular punch 400 is displaced endwise in the direction towards the pusher member 100. As the rounded ends of the punch come into engagement with the portion of the blank extending outwardly beyond the engaged planal portions and into the space 305, the cylindrical portion of the blank located within the space between the first pusher member and the guide portion is displaced forwardly to bring the edge portions of the cylindrical section of the blank into sliding engagement with the curvilinear shoulder, in the form of a torus, progressively to turn the engaged portions curvilinearly inwardly to roll the edge, as indicated by the rolled bead 24 in FIG. 11. During continued endwise displacement of the annular punch, the edge of the punch comes into engagement with the rolled edge of the cap and crushes it in a manner to impart a cylindrical-conical shape comprising an upper cylindrical portion 26 and a lower conical portion 27, as shown in FIG. 12. At the end of its travel, the punch operates to crush the upper portion of the rolled edge 24, as indicated by the numeral 28. In this manner a cap is formed having an edge of the shape shown in FIG. 13 in which the lower end 29 of the cap becomes situated immediately adjacent to and substantially perpendicular to the lowermost portion 30 of the rolled edge 24 thereby to insure an interlocking of the elements which operates to resist inadvertent displacement of the cap.

When pressure within the container tends to effect displacement of the cap which is positioned in sealing relationship thereon with the rolled edge located beneath the ring or bead at the mouth of the container, the bead will tend to urge the upper fold 31 of the cap downwardly in such a manner that the end 29 will come into operative engagement with the adjacent lower portion 30 thereby to prevent continuation of the movement in the upward direction for displacement. Without this type of locking, it would be possible for the internal pressure to blow off the cap.

The cap is completed and it suffices to proceed to return the elements in the opposite direction to their original position in preparation for the next cycle of operation.

In the embodiment of the apparatus illustrated in FIGS. 4–8, there is again shown the second pusher member 200 surrounded by the annular punch 400 which is recessed to enable relative endwise movement between the pusher 200 and the punch 400 until the base of the punch comes into engagement with the stop shoulder 402 of the recessed punch.

The first pusher member 100 is divided into two parts, i.e. a central pusher 110 and an annular pusher 120. The central pusher 110 is freely slidable in the annular pusher until the end 111 of the central pusher 110 comes into engagement with a stop 121, on the annular pusher 120. This position corresponds to the working position, i.e. to the position which brings together the elements about the first pusher 100 for operation. The annular pusher 120 is constantly urged towards the second pusher 200, as by means of a spring 122. The spring 122 is compressed when the annular pusher is urged in its seating until the abutment 123 on the annular pusher 120 comes into engagement with an abutment 311 forming a part of the casing 300 of the apparatus. The pusher 120 has a third stop 124 which limits its movement in the other direction upon engagement with a second stop 312 of the casing 300 as effected by decompression of the spring.

The casing 300 forms a part of the annular guide member and the parts 302 and 304 heretofore described are provided thereon.

The mode of operation of this apparatus is as follows: In the starting position, corresponding to that of FIG. 6, the pusher 200 and the punch 400 are in their lower position, the spring 401 is expanded, the annular pusher 120 is also in the lowered position, the stops 124 and 312 are in contact, and finally, the central pusher 110 is in its upper position relative to the annular pusher with the stops 111 and 121 also being in contact. This provides an empty space between the two pushers so that the blank 1 may be disposed therebetween.

The central pusher 110 is displaced downwardly to bear on the plate portion 12 of the blank. As the punch 400 commences its ascending movement, the pusher 200 is carried upwardly by the spring 401 until it comes into engagement with the opposite side of the cap blank to grip the planal portion between the pusher members. In response to continued upward movement of the punch, the central pusher section 110 is raised. The latter slides in the annual punch 120 until the stops 111 and 121 come into engagement. Thereafter, the ascending movement of the punch brings about the movement of the assembly of the two plungers 110 and 120 and, since the spring 122 is weaker than the spring 401, such movement results only in a slight vertical offsetting of the punch relative to the pusher 200. When the stop 123 comes into engagement with the stop 311, the ascending movement of the pusher 110 and 120 is halted and so also is the movement of the pusher 200. The spring 401 is compresed as the punch continues to ascend until the stop 402 engages the pusher 200. During this period of time, the punch has turned down the lateral portion 13 of the blank against the annular pusher 120 and the end portions 14, which are forced to engage with the toroidal end face 304 within the free space 305, are rolled to form the rolled edge 24 of the cap. The ascending movement of the punch ceases when the stop 402 engages the pusher 200 and at that time the cap is completed.

Figure 6:
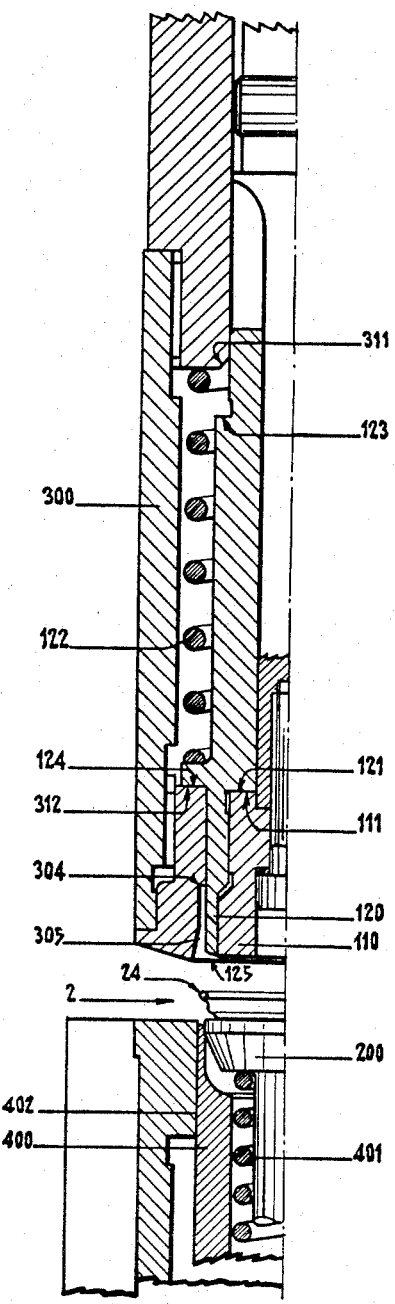
FIG. 6 is a sectional elevational view similar to that of FIGS. 4 and 5 showing the arrangement of elements after completion of the cap forming operation for removal of the formed cap.

There is then imparted to the punch a descending movement which is the reverse of the preceding movement and the punch is first of all withdrawn by pressure supplied from the spring 401 and then the assembly including the pusher 200 and the punch 400 descend together in response to the pressure on the pusher 110–120 by the spring 122. When the stop 124 comes into engagement with the stop 312, the movement of the pusher 110–120 ceases and only the assembly formed of the punch 400 and the pusher 200 continues downwardly. Thus the position shown in FIG. 6 is finally reached. The completed cap is withdrawn and can be replaced by another blank for the next cycle of operation.

Figure 10:
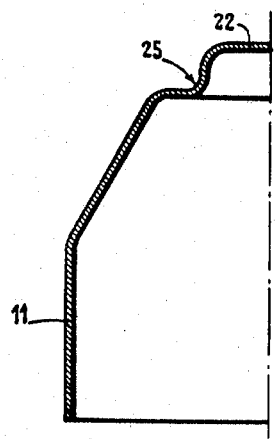
FIG. 10 is a sectional elevational view showing the cap blank as it is formed in an initial stage of the cap forming operation.
Figure 11:
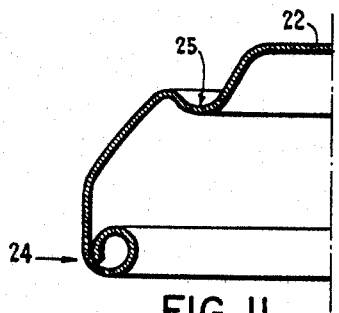
FIG. 11 is a sectional view similar to that of FIG. 10 showing the cap in a later stage of formation.
Figure 12:
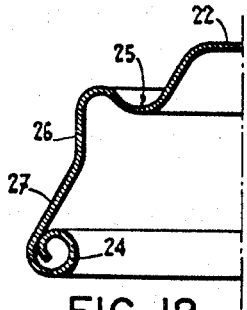
FIG. 12 is a sectional view similar to those of FIGS. 10 and 11 showing the cap in a still later stage of formation.
Figure 13:
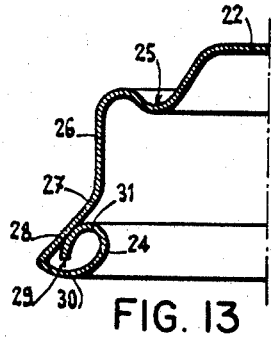
FIG. 13 is a sectional view of the cap of FIGS. 10, 11 and 12 in the final stage of formation.

During operation of the machine, the blank 1 is converted to a completed cap 2, as shown in FIG. 13, as the blank passes through the intermediate stages shown in FIGS. 10, 11 and 12.

Figure 7:
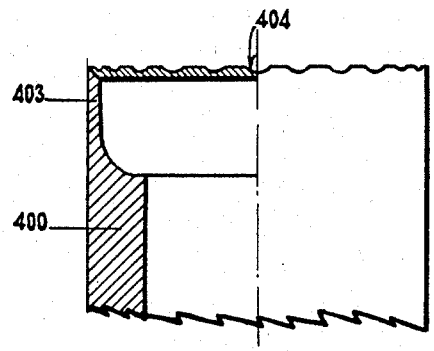
FIG. 7 is a sectional view of a modification of one of the elements of the cap forming apparatus.
Figure 8:
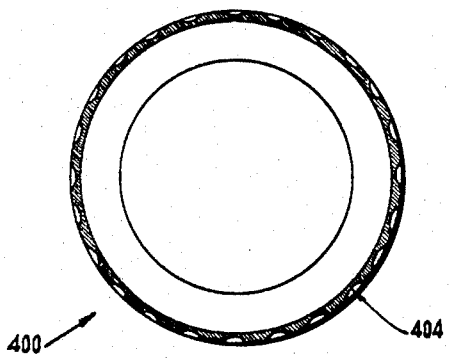
FIG. 8 is a top plan view of the elements shown in FIG. 7.
Figure 9:
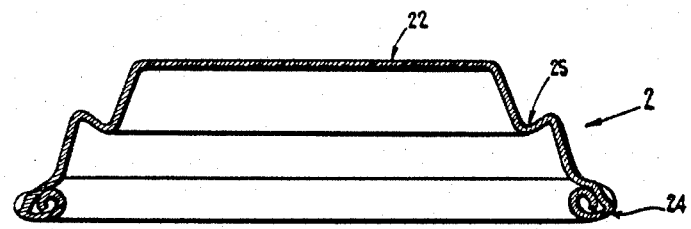
FIG. 9 is a sectional view through a modification of a cap fabricated in accordance with the practice of this invention.

If it is desired to form the cap with lateral serrations in order to facilitate removal, incisions 404 are provided in the upper end 403 of the punch, as illustrated in FIGS. 7 and 8. In this way serrations are formed on the cap which affect only the outer portions of the rolled edge. The inner face and the rolled portions themselves are not affected so that the cap can remain firmly secured, as illustrated in FIG. 9.

It is possible to contour the annular pusher 120 in such a manner as to provide a recess 125 which forms a resilient S shaped zone 25 on the cap greatly to facilitate the placement of the cap in position of use on the contanier.

It will be understood that changes may be made in the details of construction, arrangement and operation without departing from the spirit of the invention, especially as defined in the following claims.

We claim:

1. Apparatus for the manufacture of caps having a pre-rolled edge from sheet material formed into a blank having an outer cylindrical portion open at one end and closed at the other end by a relatively flat planal portion comprising a first pusher member having an end portion on which the cap blank is adapted to be received, a second pusher member in endwise alignment with the first pusher member and in which at least one of the pusher members is movable in the direction toward and away from the other to engage the planal portion of the cap blank therebetween, a guide member about the first pusher member having a concentric cylindrical section spaced outwardly from the first pusher member to provide an open space therebetween and terminating in an inwardly turned base portion of curvilinear shape, and an annular punch about the second pusher member and having an end portion in the form of a cylindrical section having an inner wall to wall dimension greater than the cross-sectional dimension of the first pusher member and an outer wall to wall dimension less than the cylindrical section of the guide member and adapted to be displaced into the open space between the first pusher member and the cylindrical section of the guide member to engage the cylindrical portion of the cap blank extending in the open space during relative endwise movement into the open space for displacement of edge portions of the blank into engagement with the curvilinear base of the cylindrical section to roll the edge portion of the blank inwardly during formation of the cap.

2. Apparatus as claimed in claim 1 in which the first and second pusher members are in the form of a cylindrical rod-like member having a relatively flat end face for engagement with the cap blank.

3. Apparatus as claimed in claim 1, in which the curvlinear portion at the base of the cylindrical section of the guide member is in the form of a quarter torus.

4. Apparatus as claimed in claim 1 in which the end portion of the annular punch is formed with incisions to form serrations in the pre-rolled edge of the cap.

5. Apparatus as claimed in claim 1 in which the cylindrical portion of the guide member is separate from the curvilinear portion thereof and forms a part of the annular punch.

6. Apparatus as claimed in claim 1 which includes spring means operatively interengaging the second pusher member and punch constantly to urge the second pusher member and the punch in a direction away from each other.

7. Apparatus as claimed in claim 1 in which the first pusher member comprises a central pusher and an annular pusher in which the central pusher is slidably received within the annular pusher.

8. Apparatus as claimed in claim 7 in which the end of the annular pusher is slightly withdrawn relative to the central pusher.

9. Apparatus as claimed in claim 7 which includes a pair of stops which limit the travel of the annular pusher relative to the guide member.

10. Apparatus as claimed in claim 7 which includes spring means having one end bearing on the annular pusher and the other end on the guide member constantly to urge the elements in the opposite direction.

11. Apparatus as claimed in claim 7 in which the central pusher and the annular pusher each carry a stop which limits the travel of the central pusher and the annular pusher to a position wherein the two pushers form the completed first pusher member.

References Cited

UNITED STATES PATENTS

| | | | |
|---|---|---|---|
| Re. 26,293 | 10/1967 | Payton | 113—121 |
| 1,766,098 | 6/1930 | Booth | 72—354 |
| 2,119,662 | 6/1938 | Williams | 113—121 |
| 2,218,102 | 10/1940 | Van Blarcom | 113—121 |
| 2,251,433 | 8/1941 | Wareham | 113—121 |
| 2,282,959 | 5/1942 | Gibbs. | |
| 2,283,503 | 5/1942 | Johnson | 113—121 |
| 2,296,550 | 9/1942 | Williams | 113—121 |
| 2,348,464 | 5/1944 | Geertsema | 113—1 |
| 2,475,830 | 7/1949 | Fink | 113—121 |
| 3,254,619 | 6/1966 | Green | 113—121 |
| 3,258,954 | 7/1966 | Dennis | 72—359 |

FOREIGN PATENTS 82,420  8/1956  Netherlands.

CHARLES W. LANHAM, *Primary Examiner.*

A. RUDERMAN, *Assistant Examiner.*

U.S. Cl. X.R.

113—1, 121